(12) United States Patent
Fidan et al.

(10) Patent No.: US 10,369,844 B2
(45) Date of Patent: Aug. 6, 2019

(54) BIELASTIC POLYESTER TIRE CORD AS CAP PLY

(71) Applicant: Kordsa Teknik Tekstil Anonim Şirketi., Kocaeli (TR)

(72) Inventors: M. Sadettin Fidan, Kocaeli (TR); Kürsat Aksoy, Kocaeli (TR); Anil Ibis, Kocaeli (TR)

(73) Assignee: KORDSA TEKNIK TEKSTIL ANONIM SIRKETI, Izmit/Kocaeli (TR)

( * ) Notice: Subject to any disclaimer, the term of this patent is extended or adjusted under 35 U.S.C. 154(b) by 15 days.

(21) Appl. No.: 15/740,353

(22) PCT Filed: Jul. 1, 2016

(86) PCT No.: PCT/TR2016/050216
§ 371 (c)(1),
(2) Date: Dec. 28, 2017

(87) PCT Pub. No.: WO2018/004487
PCT Pub. Date: Jan. 4, 2018

(65) Prior Publication Data
US 2019/0030956 A1    Jan. 31, 2019

(51) Int. Cl.
*B60C 9/22* (2006.01)
*B60C 9/00* (2006.01)
*B60C 1/00* (2006.01)
*D02G 3/48* (2006.01)

(52) U.S. Cl.
CPC .......... *B60C 9/0042* (2013.01); *B60C 1/0016* (2013.01); *B60C 9/22* (2013.01); *D02G 3/48* (2013.01); *B60C 2009/0092* (2013.01); *B60C 2009/2214* (2013.01); *B60C 2009/2257* (2013.01); *B60C 2009/2285* (2013.01); *D10B 2331/04* (2013.01)

(58) Field of Classification Search
CPC .............. B60C 9/22; B60C 2009/2276; B60C 2009/2261; B60C 1/00; B60C 9/0021; B60C 2009/0021; D07B 1/068; D07B 1/04; D07B 2201/201
USPC .......................................... 57/241, 312, 223
See application file for complete search history.

(56) References Cited

U.S. PATENT DOCUMENTS

| | | | |
|---|---|---|---|
| 4,749,016 A | 6/1988 | Kojima et al. | |
| 5,139,874 A * | 8/1992 | Starinshak | B60C 9/0007 428/375 |
| 5,461,850 A * | 10/1995 | Bruyneel | D07B 1/0613 57/212 |
| 6,659,149 B2 * | 12/2003 | Pereira | B60C 15/0018 152/539 |
| 6,799,618 B2 | 10/2004 | Reuter et al. | |

(Continued)

FOREIGN PATENT DOCUMENTS

| EP | 987128 A2 | 3/2000 |
|---|---|---|
| EP | 9871288 A2 | 3/2000 |

*Primary Examiner* — Tajash D Patel
(74) *Attorney, Agent, or Firm* — Gokalp Bayramoglu (57) ABSTRACT

The present invention relates to a novel polyester tire cord reinforcement which has bi-elastic tensile properties. The tire cord includes at least two cord plies, and there is a spacing between the cord plies. Such a novel bi-elastic polyester tire cord improves high speed durability and significantly eliminates flatspotting when used as a cap ply in pneumatic radial tires.

8 Claims, 8 Drawing Sheets

(56) References Cited

U.S. PATENT DOCUMENTS

| | | | |
|---|---|---|---|
| 7,584,774 B2 | 9/2009 | Nakajima | |
| 8,191,348 B2 * | 6/2012 | Barguet | B60C 9/0007 |
| | | | 57/223 |
| 8,857,146 B2 * | 10/2014 | Gauthier | D07B 1/0613 |
| | | | 57/223 |
| 8,863,490 B2 * | 10/2014 | Boisseau | D07B 1/0613 |
| | | | 57/223 |
| 2010/0175803 A1 | 7/2010 | Jeon et al. | |
| 2013/0025758 A1 | 1/2013 | Kim | |
| 2014/0224402 A1 * | 8/2014 | Sallaz | B60C 9/22 |
| | | | 152/527 |

* cited by examiner

Fig. 11

BIELASTIC POLYESTER TIRE CORD AS CAP PLY

CROSS REFERENCE TO RELATED APPLICATIONS

This application is the national phase entry of International Application No. PCT/TR2016/050216, filed on Jul. 1, 2016, the entire content of which is incorporated herein by reference.

TECHNICAL FIELD

The present invention relates to a novel polyester tire cord reinforcement which has bi-elastic tensile properties. Such a novel bi-elastic polyester tire cord improves high speed durability, eliminates flatspotting and enables high liftings during tire building and curing processes when used as spirally wound zero degree cap strip in pneumatic radial tires.

BACKGROUND OF THE INVENTION

Under high speed conditions, the outer diameter of the tire increases due to centrifugal forces generated by steel cord belt package and tread. Such a diameter increase or tire growth increases the pantographic movements of the belt edge cords leading to the crack initiations, crack propagations and at the end belt edge separations.

The cap ply layer wound on belt package circumferentially prevents excessive tire growth under high speed conditions by applying compressive forces (restraining force) on heavy belt package made of cross ply steel cord layers.

Currently, most widely used cap ply materials are multiply nylon 6.6 layers or single layer hybrid cords which are spirally wound on belt package at 0 to 5 degrees to equatorial plane of the tire. In addition to nylon 6.6 and aramid/nylon 6.6 hybrid cords, there are also some polyester (polyethylene terephthalate, PET) applications as cap ply. But due to high initial modulus of PET, there is a risk of tight cord formation after lifting which means contact with steel cords of the top belt layer leading to cord breaks under dynamic conditions.

Nylon cords have excellent fatigue resistance under bending and axial compression, and bielastic tensile characteristic enabling easy processing during tire building. Additionally, shrinkforce generation with increasing service temperature under high speed conditions improves belt edge separation resistance and high speed durability. But low glass transition temperature of nylon causes flatspot problems in tire during parking after high speed driving. Other potential drawback of multiply nylon cap ply assembly is its high rubber gauge which cause to increase the rolling resistance of the tire by hysteresis (heat build up).

As mentioned above, the hybrid cords comprising high and low modulus yarns having bi-elastic tensile behaviour are also used as cap ply in high speed tires. The low modulus component of hybrid cord enables easy belt package lifting without tight cord formation due to its high extensibility and the high modulus component becomes effective in service conditions. By using hybrid cords as cap ply, the total thickness of the cap ply layer and rubber content can be reduced, and the high modulus component of the hybrid cord enhances the restraining force and improves the high speed durability. But existence of nylon causes also some flatspot. As cap ply, hybrid cord containing aramid is a expensive solution.

On the other hand, cap ply cords made of ultra high modulus yarns having high twist have been also used as tire reinforcement to eliminate flatspot and improve high speed performance, but high level of cord twist results in drastic modulus and breaking strength(tenacity) losses.

U.S. Pat. No. 6,799,618 describes a textile cap ply structure which is superimposed radially outwardly to the belt assembly is reinforced with cords being made of materials including nylon and aramid. At initial elongation of the cords, the primary load bearing yarns are nylon yarns, and after appreciable elongation the primary load bearing yarns are the aramid yarns.

U.S. Pat. No. 7,584,774 describes a belt reinforcing layer (cap ply) dieposed outside the belt in the radial direction, characterized in that the belt reinforcing layer is formed by continuously and spirally winding a polyethylene terephtalate(PET) cord in a circumferential direction of the tire, and this cord has an elastic modulus of not less than 2.5 mN/dtex. % under a load of 29.4N measured at 160° C. Due to high initial modulus of the PET cord, lifting must be less tha 2% in this applications to prevent excessive tight cord formations.

U.S. Pat. No. 2013/0025758 describes a high performace pneumatic radial tire for passenger cars which uses a hybrid cord composed of two ply aramid yarn and single ply nylon yarn having different twist counts for the first twist and different twist counts for the second twist, as a cap ply, and thereby has improved high speed durability and steering stability.

SUMMARY OF INVENTION

The invention provides a two or more ply polyester cord reinforcement having bielasic tensile properties. Namely, low initial modulus and high modulus after initial elongation. In order to prevent modulus and breaking strength loss, high level of cord twisting has been avoided.

The production principle of the transformation of more or less linear tensile behaviour of the polyester cord to bielastic characteristic(initial modulus reduction and enhacing initial extensibility with low forces) is based on the opening the cord plies and insertion of RFL adhesive between them. The polyester cord having RFL between its opened plies shows bielastic tensile behaviour under tension.

Definitions:

Cord: The product formed by twisting together two or more plied yarns

Cord ply: Plied single yarns within cord.

Dtex: The gram weight of yarn having 10.000 meter length.

Flatspotting: Cords in tire having low Tg and high thermal shrink force is subjected to shrinkage at footprint. When cooled in this position, the cord maintains flatspot until it again reaches its Tg in use.

Greige cord: Twisted cord before dipping and heat-setting

Heat-setting: The process of conferring dimensional stability and heat resistance to the yarns, cords or fabrics by means of either moist or heat.

Heat-set cord: Cord exposed to high temperature (e.g. 120° C. to 260° C. under tension)

Linear density: Weight per unit length as g/dtex or g/d (denier)

Spacing(s): Mutual ply-to-ply distance within a multi-ply twisted cord

TASE at 2% elongation: Stress at 2% elongation as cN/dtex

Tenacity: Breaking force (N) divided by linear density (dtex)

Tg: Glass transition point of polymer

Total nominal cord dtex: Sum of nominal yarn linear densities (3340 dtex for 1670×2 cord)

Twist: Number of turns about its axis per meter of a yarn or cord(t/m or tpm)

Ultra high modulus yarn: Tensile modulus higher than 100 GPa

BRIEF DESCRIPTION OF THE DRAWINGS

FIG. 7A-7D describes the opening of the cord cross sections and subsequent dip penetration between the cord plies for two and three-ply polyester cords, in which FIG. 7A are cross-sectional views of two and three-ply polyester cords in closed-plies form, FIG. 7B are cross-sectional views of two and three-ply polyester cords in opened-plies form, FIG. 7C are cross-sectional views of two and three-ply polyester cords in dip impregnated form according to invention.

DETAILED DESCRIPTION OF THE INVENTION

Figure 1:
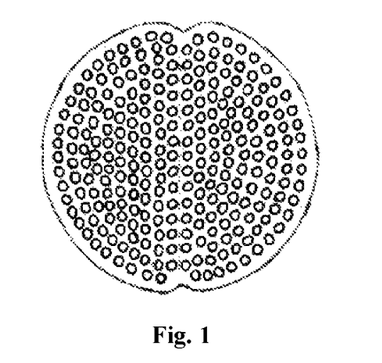
FIG. 1 is a cross-sectional view of a conventional (prior art) two-ply polyester cord.
Figure 2:
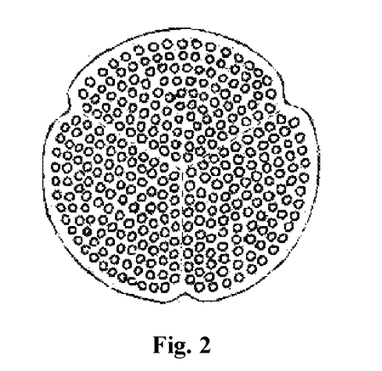
FIG. 2 is a cross-sectional view of a conventional (prior art) three-ply polyester cord.

PET with its high modulus and low thermal shrinkage is a dimensionally stable material. In twisted form as two or three-ply cord, it can be used as carcass and cap ply reinforcement in radial passanger and light truck tires (FIG. 1 and FIG. 2).

The cord twisting improves bending and compression fatigue resistance of the PET, but at the same time reduces the modulus and strength too.

In zero degree cap ply applications in pneumatic radial tires, the high modulus is needed for restraining force to prevent belt edge separations under high speed conditions, but initial extensibility with low forces (initial low modulus) is also needed for processability during lifting of belt package in tire building and curing processes to avoid cord cuttings through the belt skim compound.

Figure 3:
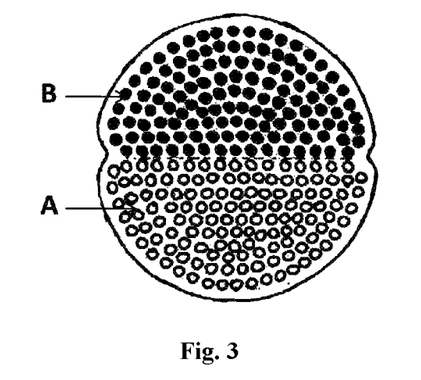
FIG. 3 is a cross-sectional view of a conventional (prior art) two-ply hybrid cord in which, A is aramid ply (yarn), B is nylon ply(yarn).
Figure 4:
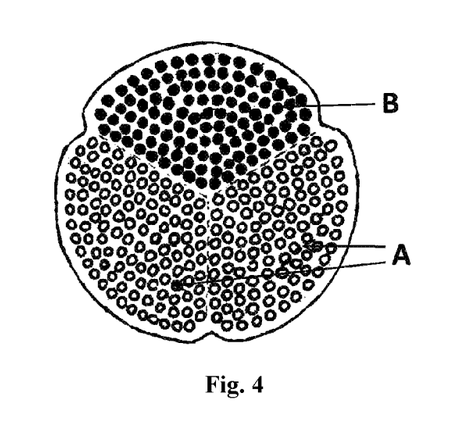
FIG. 4 is a cross-sectional view of a conventional (prior art) three-ply hybrid cord in which, A is aramid ply (yarn) and, B is nylon ply (yarn).

Aramid/Nylon hybrid cords solve this issue, but existence of nylon creates flatspot problem and asymmetric cord structure (FIG. 3 and FIG. 4)

Figure 5:
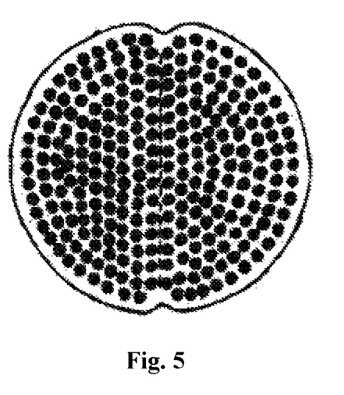
FIG. 5 is a cross-sectional view of a conventional (prior art) two-ply nylon cord.
Figure 6:
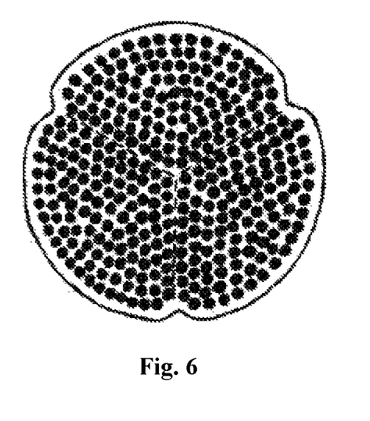
FIG. 6 is a cross-sectional view of a conventional (prior art) three-ply nylon cord.
Figure 7A:
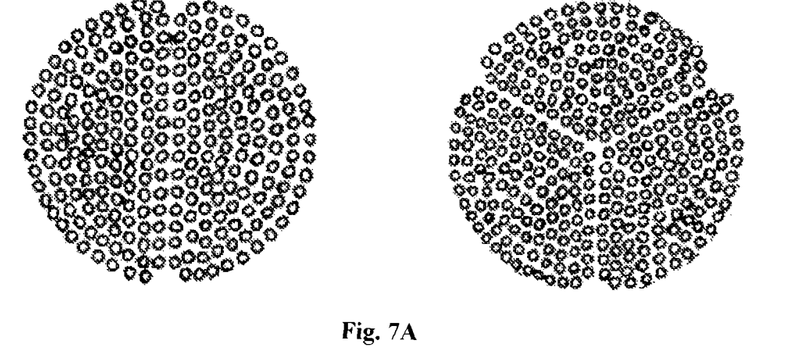
Figure 7B:
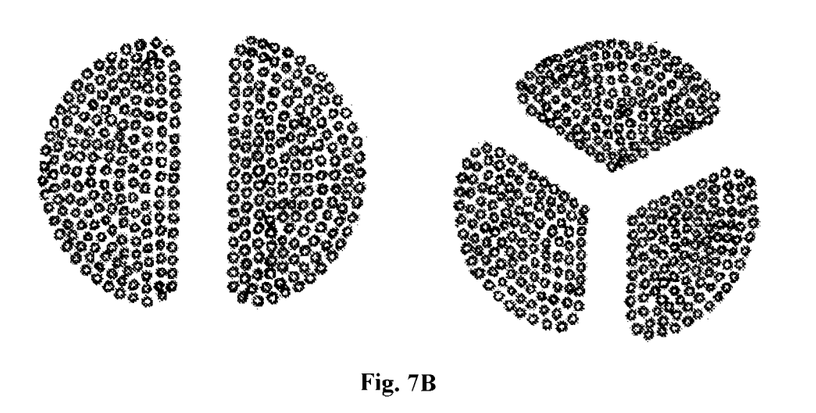
Figure 7C:
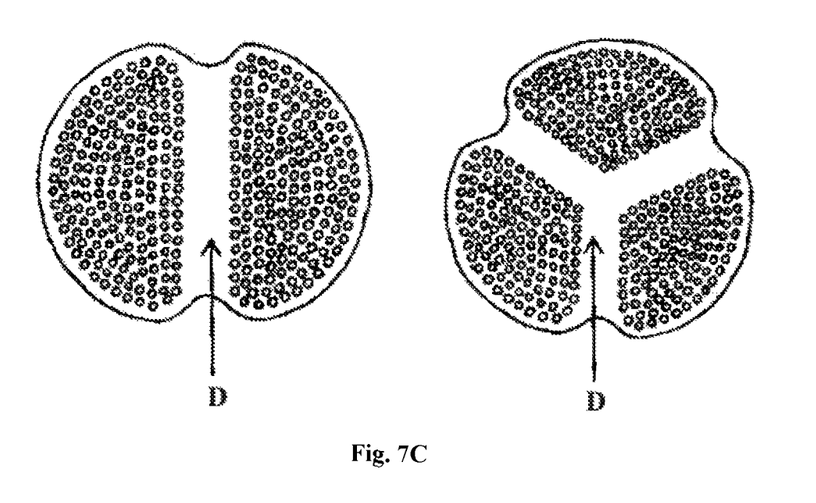
Figure 7D:
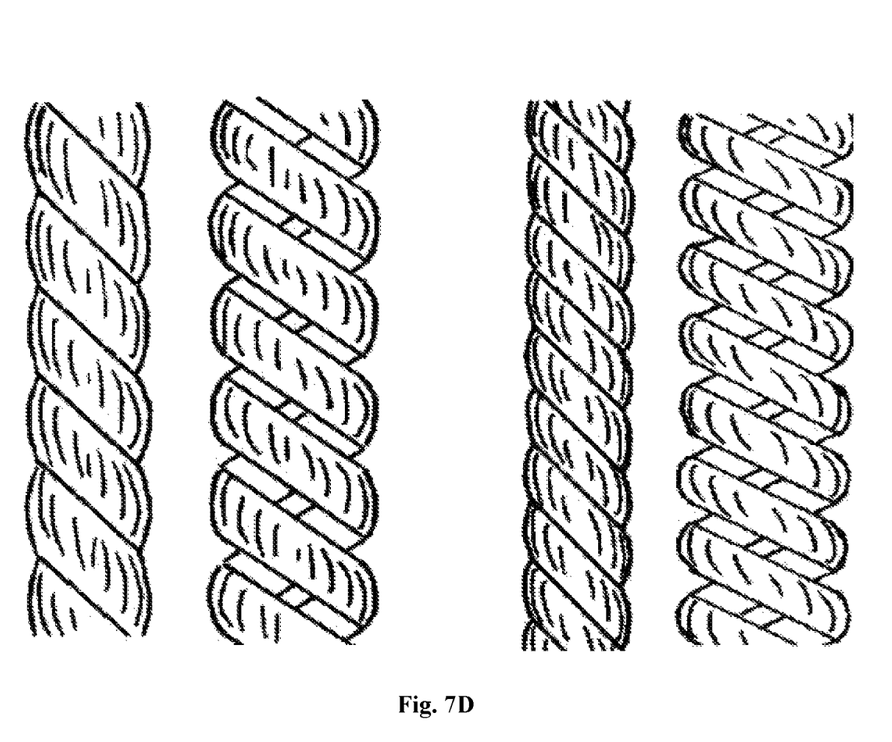
FIG. 7D is adhesive dip (RFL) filling the openings between the plies and covering the cord surface.
Figure 8A:
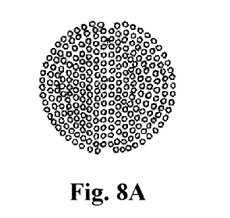
FIG. 8A are respectively lateral and cross-sectional views of a conventional two-ply polyester cord.
Figure 8B:
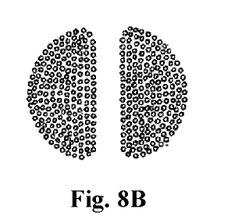
FIG. 8B are respectively lateral and cross-sectional views of two-ply polyester cord in opened form according to invention (before dipping step).
Figure 9A:
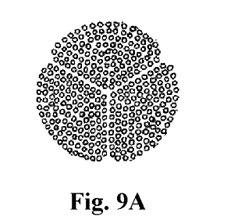
FIG. 9A are respectively lateral and cross-sectional view of a conventional three-ply polyester cord.
Figure 9B:
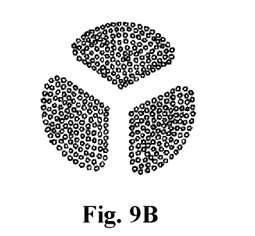
FIG. 9B are respectively lateral and cross-sectional views of a three-ply polyester cord in opened form according to invention (before dipping step).

Two or three-ply nylon 6 and 6.6 cords (FIG. 5 and FIG. 6) are well known reinforcements as cap ply in radial passenger car and light truck tires, but flatspot and low level of modulus are their major drawbacks.

According to the present invention, two or more ply polyester cords without any low modulus component ply like nylon, can be produced with bielastic tensile properties (FIG. 7A-7D). Such a novel bi-elastic polyester cords can be used as zero degree cap ply in radial tires to improve high speed durability and do not show any significant flatspotting.

Figure 11:
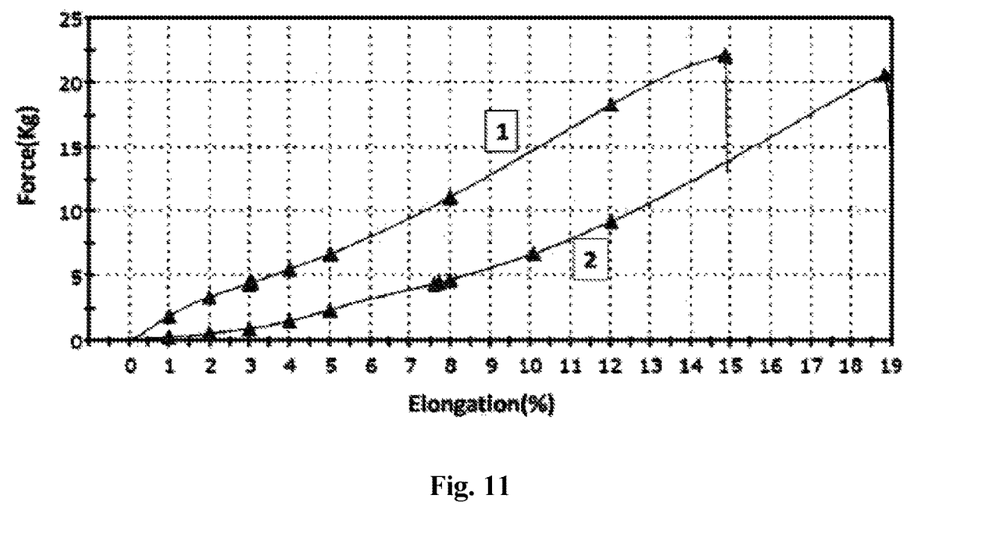
FIG. 11 shows load-elongation curves of a polyester (PET) cords in which, curve 1 is 1670 dtex/2 dipped PET cord having Z/S, 350/350 tpm twist (prior art) having linear tensile characteristic, curve 2 is 1670 dtex/2 aramid cord having Z/S, 350/300 tpm (50 tpm back-twisted in Z direction) and dipped having bielastic tensile characteristic according to invention.

According to invention, the basic production principle of the bielastic polyester cord is to open the cord plies and insertion of the adhesive between the plies. The polyester cord containing high percentage of adhesive like RFL between its plies becomes extensible with low forces and during this extension the polyester cord plies applies compressive forces to the adhesive material (RFL) and squeeze it. During this squeezing process cord elongates with low forces. After polyester cord plies having been approached to each other (closed), polyester cord resist to elongation and it becomes high modulus cord again (FIG. 11).

In order to obtain a bielastic tensile characteristics, the polyester cord plies can be opened with different methods:

a—The two or more ply greige polyester cords are heat-set at a temperature between 120° C. and 250° C. and after cooling down they are partially back-twisted in opposite direction of cord twist. During this back-twisting process, the cord plies are opened (FIGS. 8-10) The polyester cords with its opened plies are dipped and heat set again, and during this process the voids between cord plies are filled with dip solution and the external surface of the cord plies are also covered dip solution.

b—The two or more ply greige polyester cords are dipped and heat-set at a temperature between 120° C. and 250° C. and after cooling down they are partially back-twisted in opposite direction of cord twist. During this back-twisting process, the cord plies are opened. The polyester cords with its opened plies are dipped and heat set again, and during this process the voids between cord plies are filled with dip solution and the external surface of the cord plies are also covered additional dip solution.

c—The two or more ply polyester cords are subjected to axial compression during dipping process, and the cord with opened plies under compression absorbs dip solution between the open cord plies. After dipping process, the polyester cord with penetrated dip solution between its plies are dried and heat set between 120° and 250° C.

Figure 10A:
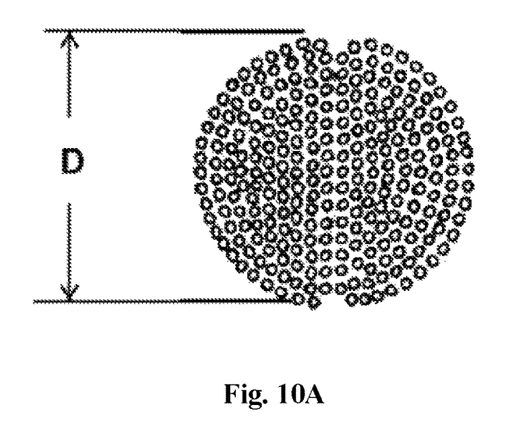
FIG. 10 are cross-sectional views of closed and opened forms of cord plies. D is cord diameter and s is spacing (opening) between cord plies.
Figure 10B:
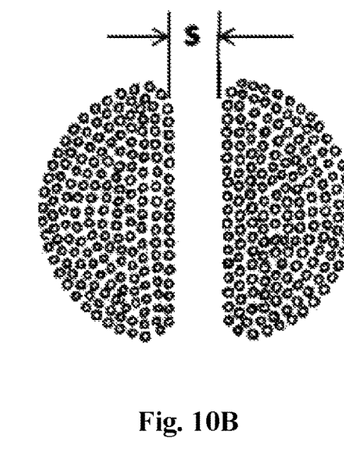
Figure 10C:
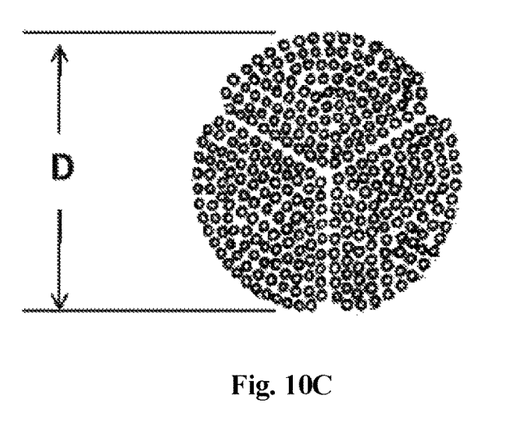
Figure 10D:
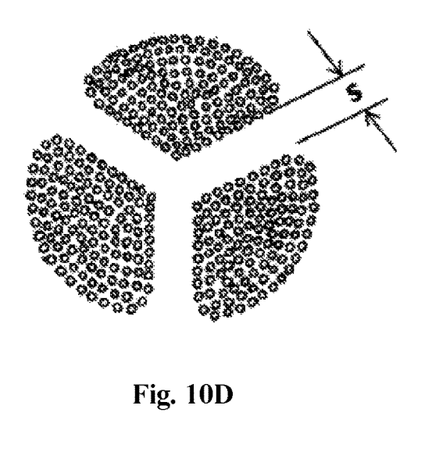

The tensile bielasticity characteristic of the polyester cord can be changed with the ply opening degree(s) in FIG. 10B and FIG. 10D), dip type, dip content between the plies and the curing degree of the dip at high temperature (dip hardness).

According to invention, two or more ply polyester cord has less than 2.0 cN/dtex TASE value at 2% elongation determined in accordance with ASTM D885-16 and the spacing(s) between the cord plies which is filled with adhesive dip, is higher than 0.1 xD and less than 0.6 xD.

2% TASE higher than 2.0 cN/dtex cause tight cords when applied as cap ply during process lifting of the tire.

Preferably, s is higher than 0.2 xD and less than 0.5 xD.

According to invention, the dip pick up (DPU) in the dipped cord is higher than 8% and less than 30%, preferably, higher than 10% and less than 20%, by weight.

Less than 8% DPU can not totally fill the the openings between the cord plies, and higher than 30% DPU leads to too thick cord diameters.

According to invention, the twist factor of the cord is higher than 10,000 and less than 22,000 which is determined based on the following formula;

$$\text{Twist factor} = \text{cord twist (tpm)} \times \text{square root of total nominal cord dtex} \quad (1)$$

The cords with lower than 10,000 twist factor have insufficient fatigue resistance under bending and the cords with higher than 22,000 twist factor have significant modulus reductions.

According to invention, the total nominal cord linear density is higher than 800 dtex and less than 6000 dtex.

The cords having less than 800 dtex are not effective enough, and the cords having higher than 6000 dtex are too thick.

The preferable polyester polymer types are polyethylene terephthlate and polyethylene naphthlate.

What is claimed is:

1. A dipped and heat-set polyester cord, comprising a plurality of cord plies having a spacing between the plurality of cord plies, wherein a TASE at 2.0% elongation of the dipped and heat-set polyester cord is less than 2.0 cN/dtex; wherein the spacing between the plurality of cord plies is longer than 10% and shorter than 60% of a cord diameter of the cord plies.

2. The dipped and heat-set polyester cord according to claim 1, wherein the spacing between the plurality of cord plies of the dipped and heat-set polyester cord is preferably longer than 20% and shorter than 50% of the cord diameter.

3. The dipped and heat-set polyester cord according to claim 1, wherein an adhesive dip pick-up (DPU) of the cord is higher than 8% and less than 30% by weight.

4. The dipped and heat-set polyester cord according to claim 1, wherein the adhesive dip pick-up (DPU) of the dipped and heat-set polyester cord is preferably higher than 10% and lower than 20% by weight.

5. The dipped and heat-set polyester cord according to claim 1, wherein the dipped and heat-set polyester cord has a twist factor in between 10,000-22,000; wherein the twist factor is calculated according to the following formula (1):

$$\text{twist factor} = \text{cord twist (tpm)} \times \text{square root of total nominal cord dtex} \quad (1).$$

6. The dipped and heat-set polyester cord according to claim 1, wherein the dipped and heat-set polyester cord has a total nominal linear density in between 800 dtex-6,000 dtex.

7. The dipped and heat-set polyester cord according to claim 1, wherein the dipped and heat-set polyester cord is a polyethylene terephthalate cord.

8. The dipped and heat-set polyester cord according to claim 1, wherein the dipped and heat-set polyester cord is a polyethylene naphthalate cord.

* * * * *